Patented Sept. 7, 1937

2,091,955

UNITED STATES PATENT OFFICE 2,091,955

METHOD OF PREPARING A TITANIUM PIGMENT

Benjamin Wilson Allan, Baltimore, Md., assignor to American Zirconium Corporation, Baltimore, Md., a corporation of Maryland No Drawing. Application March 15, 1935, Serial No. 11,294

5 Claims. (Cl. 134—58)

This invention relates to the manufacture of titanium dioxide pigments and more particularly to the manufacture of titanium dioxide pigments characterized by unusual whiteness, extreme softness of texture and absence of soluble salts. Specifically, it relates to titanium pigments which are produced by calcination in the presence of fluorine compounds not volatile during the early stages of calcination.

Titanium dioxide is a pigment of outstanding value, because of its relative inertness, and high opacity. It has been prepared by a large number of methods; but in all cases, the final product is prepared by the calcination of a precipitate of raw hydrated titanic oxide. In the methods in common use, the pigment is obtained by the hydrolytic precipitation of solutions of titanium salts (particularly titanium sulphate) and the precipitate is always a more or less hydrated titanium oxide containing some acid adsorbed onto or combined with the precipitate. This precipitate is washed, dried and calcined to remove the water and acid, and to change the structure of the precipitate to bring up the opacity and other pigment properties.

When titanium oxide precipitates are heated to temperatures in the range from 700–1000° C. the water and acid are driven off, but the acid is entirely eliminated only with prolonged heating, which results in overcalcination, with the production of a pigment which is hard and gritty, difficult to grind, low in opacity and dirty in color. To overcome this difficulty, so-called conditioning agents have been used. These addition agents are used to reduce the time required for the elimination of the acid, whereby overcalcination is avoided; and they also appear to be of assistance in developing desirable pigment properties.

One group of conditioning agents suggested is the basic reacting metal compounds, on the theory that the acid is thereby neutralized. These addition agents leave soluble or insoluble sulphates in the pigment. It is impossible to completely eliminate the soluble sulphates, even if the calcined pigment is wet ground, and carefully washed; while the insoluble sulphates always remain behind as diluents to reduce the desirable main pigment properties. In addition, the beneficial effect of basic compounds, as such, is rather small, the alkali bases being far superior to the other bases.

Much better results are obtained with the class of alkali metal compounds, as described by Blumenfeld and Mayer (U. S. Patent #1,892,693, January 3, 1933). Unfortunately, the resulting calcined pigment always contains soluble alkali metal sulphates which cannot be removed completely, even with the introduction of a careful and expensive washing operation.

Goldschmidt (U. S. Patent #1,348,129, July 27, 1920) suggests the use of halogen compounds volatile under the calcination conditions, such as zinc chloride and ammonium fluoride; but these compounds do not improve the pigment properties to any considerable extent. Other conditioning agents have been suggested by various workers; but none have been as efficacious as the alkali metal compounds, which are largely used in practice today.

I have discovered that if the fluorine be added to the pigment before calcination in such form as to be non-volatile during the early stages of calcination, the fluorine compound acts as a conditioning agent, apparently reacting with the pigment to form fluortitanic acid, which appears to be the active conditioning agent. The reaction takes place variously during the early stages of calcination, depending on the particular compound used. Where metallic fluorides or oxyfluorides are used, they form $H_2F_2$ with the acid present in the raw pigment cake, as the temperature of the mass is raised in the calciner from room temperatures; this reacts with the $TiO_2$ as follows:

(1) $\quad TiO_2 + 2H_2F_2 = TiF_4 + H_2O$
(2) $\quad TiF_4 + H_2F_2 = H_2TiF_6$ As the temperature rises, Reaction 2 reverses itself; and as temperatures rise higher, Reaction 1 reverses, the $H_2F_2$ being volatilized. Thus, pigments are obtained which are whiter and softer than the prior art products, the opacity being similar to that obtained by the use of alkali compounds.

Two outstanding advantages in operation, in addition to the improved pigment properties, are possible by the use of fluorine. First, the tendency to overcalcination is reduced to such an extent that more latitude in this regard can be allowed in plant operations, both as to time and temperature, in distinction to the necessity for careful control in prior art practice. Second, if the fluorine is added in combination with an element whose oxide or sulfate is insoluble, no washing is required, as no soluble salts need be present as in the case of alkali compound conditioning agents.

I prefer to add my fluorine to the pigment slurry obtained from the hydrolysis step, just before calcination, in the form of a soluble or insoluble fluoride, oxyfluoride or fluortitanate. If a volatile fluorine compound is used, such as hydrofluoric acid, or ammonium fluoride, it is necessary to allow sufficient time for a reaction before reaching the volatilization temperature, to permit reaction with the titanium or other material present to fix the fluorine, and prevent premature volatilization. Hydrofluoric acid reacts fairly rapidly to form a titanium fluorine compound in which the fluorine is fixed; but with ammonium fluoride, care must be taken to obtain a reaction, as it is relatively unreactive in the slurry.

To illustrate my invention, the following examples are cited, it being understood that various modifications are possible without departing from the spirit of my invention.

Example 1

To 100 grams of titanium dioxide in a slurry (prepared by the hydrolysis of a titanium sulphate solution obtained from ilmenite) I added 1 gram of hydrofluoric acid, in 60% aqueous solution. The mixture was stirred thoroughly, and excess liquid was separated by filtration. The precipitate was then calcined in an open muffle at 850° C. for 2 hours. A sample of the untreated pigment was calcined simultaneously.

The treated pigment was extremely white, soft, and had good covering power and tinting strength, and gave a slightly acid reaction with brom-thymol blue indicator. The untreated pigment was grey, harsh, and highly acid; its tinting strength was only 75% that of the treated material.

Example 2

The treatment of Example 1 was duplicated, using 3 grams of hydrofluoric acid. The pigment was similar to that obtained in Example 1, but somewhat softer and of slightly higher tinting strength.

Example 3

The treatment of Example 1 was duplicated using 5 grams of hydrofluoric acid. The pigment was extremely soft, and as compared with Example 1, the tinting strength was about 10% higher.

Example 4

The composition of Example 3 was calcined in an open muffle for 2 hours at 1050° C. The pigment was similar to that of Example 3.

A similar pigment slurry was calcined after adding 2% $K_2CO_3$ at 1050° C. for 2 hours. The pigment obtained was rather bluish grey in shade, much harder than the fluorine treated material, although still satisfactory as to texture. It gave an extremely alkaline reaction with bromthymol blue. The same composition, calcined at 850° C. was softer than the overcalcined material, less alkaline, and much whiter in color, although not as white as the fluorine treated pigment.

Example 5

A slurry of 100 grams titanium dioxide was mixed with titanium fluoride solution equivalent to 3 grams of $H_2F_2$. The mixture was calcined for 2 hours at 950° C. The pigment properties were very similar to those obtained in Example 2.

Increasing percentages of titanium fluoride act like increasing percentages of $H_2F_2$ improving softness and slightly bettering tinting strength and color.

Example 6

A solution of fluortitanic acid equivalent to 2 grams of $H_2F_2$ was added to 100 grams of titanium dioxide in a typical hydrolysis slurry, and calcined at 950° C. for 2 hours. The product was similar to that of Example 5.

Example 7

Calcium fluoride equivalent to 1% $H_2F_2$ was suspended in a slurry similar to that of Example 6, and excess liquid removed by filtration. The product obtained on calcination at 950° C. for two hours was similar to that of Examples 5 and 6, except that the pigment was slightly alkaline to bromthymol blue.

Zinc fluoride, similarly substituted, gave similar results.

Example 8

Sodium and potassium fluoride were substituted in equivalent quantity, for the fluortitanic acid of Example 6. The pigments were similar, but were very alkaline and contained water soluble compounds.

Example 9

Magnesium fluortitanate was substituted as above. The pigment was again similar but was slightly alkaline.

Barium fluortitanate gave similar results.

Example 10

When ammonium fluoride was substituted in Example 2, no beneficial results were obtained. When the equivalent of 4 grams of $H_2F_2$ were used, and the slurry was stirred for 90 minutes before calcination, an improvement in properties was noted, the pigment being approximately like that of Example 1.

Example 11

The experiment of Example 2 was repeated, with the introduction of 1 cc. of N/10 potassium permanganate solution. The pigment calcined after addition of 3 grams $H_2F_2$ was practically the equivalent of the pigment produced in the absence of manganese; the pigment produced without treatment was much yellower than in the absence of manganese. I attribute this startling improvement to the formation of a white manganese fluorine-titanium compound.

As shown by the examples, where soluble compounds of titanium are used, the slurry should preferably not be filtered, to avoid loss of fluorine; with insoluble fluorine compounds, the slurry may be filtered or not, as desired.

The fixation of the fluorine is of considerable importance. Even though $H_2F_2$ is extremely reactive, it is not as efficient as its equivalent in fixed salts, apparently because it is prematurely lost in calcination; while ammonium fluoride, being volatile and rather unreactive, requires preliminary treatment to prevent its entire escape. The presence of acid in the pigment cake before or during calcination helps in the formation of the titanium fluorine compounds (probably fluortitanic acid) which are formed, and thus facilitates fixation.

I prefer to add the fluorine in such form as to get a neutral pigment, free of soluble salts; hydrogen fluoride, fluortitanic acid, and titanium fluoride or oxyfluoride, are all in this preferred group.

The method of preparing the titanium oxide slurry has, of course, a considerable effect on the pigment properties of the resultant calcined product; but my method may be used with any titanium oxide pigment, regardless of method of preparation, to produce improved properties over untreated pigment. I prefer to operate with sulphate or chloride solutions prepared from ilmenite according to the standard methods now in use, or more preferably according to the co-pending Allan and Bousquet application, Serial #6,130 filed February 11, 1935, but I have used other solutions, such as those prepared from rutile by the method of Richter (U. S. Patent #1,932,087, October 24, 1933).

The titanium pigment need not be substantially pure titanium dioxide; but composite pigments comprising titanium dioxide mixed with extenders such as barium and calcium sulphate, or pigments which are largely insoluble titanates, etc. may be used, and calcined with improved results in the presence of reactable fluorine.

By the use of reactable fluorine in the calcination step, I produce new titanium pigments, characterized physically by improved color and texture as compared with prior art pigment, high tinting strength, neutrality and freedom from soluble salts if desired.

Various substitutions can be made in the specific examples shown, which are merely illustrative, without departing from the spirit of my invention.

I claim:

1. In the production of pigment containing titanium dioxide, the step which comprises calcining a titanium precipitate containing acid, in admixture with fluortitanic acid, using a final calcination temperature of 700–1050° C.

2. The process of claim 1 in which the fluortitanic acid is formed in situ.

3. The process of claim 1 in which the fluortitanic acid is formed in situ from a fluoride.

4. The process of claim 1 in which the fluortitanic acid is formed in situ from an oxyfluoride.

5. In the production of pigment containing titanium dioxide, the step which comprises calcining a titanium precipitate containing acid, in admixture with titanium fluoride, using a final calcination temperature of 700–1050° C.

BENJAMIN WILSON ALLAN.